United States Patent [19]
Satoh

[11] Patent Number: 5,820,969
[45] Date of Patent: Oct. 13, 1998

[54] MAGNETIC RECORDING MEDIUM

[75] Inventor: Takeshi Satoh, Tochigi-ken, Japan

[73] Assignee: Kao Corporation, Tokyo, Japan

[21] Appl. No.: 702,128

[22] Filed: Aug. 23, 1996

[30] Foreign Application Priority Data

Sep. 5, 1995 [JP] Japan ................................ 7-228384
Jan. 19, 1996 [JP] Japan ................................ 8-007086

[51] Int. Cl.$^6$ ...................................................... G11B 5/66
[52] U.S. Cl. ........................... 428/141; 428/408; 428/639; 428/640; 428/650; 428/651; 428/658; 428/660; 428/662; 428/663; 428/666; 428/694 TR; 428/694 TS; 428/694 ST; 428/900
[58] Field of Search .................................. 428/141, 408, 428/639, 640, 651, 655, 656, 658, 660, 661, 662, 663, 666, 694 TR, 694 TS, 694 ST, 900, 650

[56] References Cited

U.S. PATENT DOCUMENTS

| 4,647,494 | 3/1987 | Meyerson et al. | 428/216 |
| 4,833,020 | 5/1989 | Shiroishi et al. | 428/336 |
| 5,314,745 | 5/1994 | Okumura | 428/336 |

FOREIGN PATENT DOCUMENTS

| 0 438 177 | 7/1991 | European Pat. Off. |
| 4-255908 | 9/1992 | Japan . |
| 2 282 001 | 3/1995 | United Kingdom . |

*Primary Examiner*—Stevan A. Resan
*Attorney, Agent, or Firm*—Oblon, Spivak, McClelland, Maier & Neustadt, P.C.

[57] ABSTRACT

A magnetic recording medium comprises a substrate and a magnetic layer provided on the substrate, and has a surface profile satisfying the following conditions (1) to (6):

(1) the number of peaks which project above a slice line at a depth of 25 Å from the maximum peak height (PC25) is 5 to 100/mm;

(2) the ratio of the number of peaks which project above a slice line at a depth of 50 Å from the maximum peak height (PC50) to PC25 (PC50/PC25) is 1 to 3;

(3) the ratio of a high spot count (HSC) at the center line to PC25 (HSC/PC25) is 1 to 4;

(4) the skewness is 1 to 5;

(5) the maximum peak height is 60 to 200 Å; and (6) the bearing ratio at a depth of 50 Å from the maximum peak height is not more than 3%.

4 Claims, 2 Drawing Sheets

MAGNETIC RECORDING MEDIUM

BACKGROUND OF THE INVENTION

1. Field of the Invention

This invention relates to a magnetic recording medium. More particularly, it relates to a magnetic recording medium whose surface profile is controlled so as to have a low glide height and improved CSS durability.

2. Description of the Related Art

In the field of magnetic disks, such as a hard disk used as an external memory device of computers, etc., one means for improving electromagnetic conversion characteristics is to minimize the distance between a magnetic head and a magnetic disk, i.e., a glide height. In this sense, it is generally desirable for a magnetic disk to have a smooth surface. However, too smooth a surface tends to cause head adsorption, i.e., a phenomenon of a magnetic head's sticking to a magnetic disk, which would damage the magnetic disk or head. To avoid this, texture treatment for appropriately roughening the surface of a magnetic disk is generally carried out.

Such texture treatment includes a method of applying a texture treatment to the substrate of a magnetic disk and a method of forming a texture layer on the substrate. The former method includes a method of mechanically or chemically abrading the surface of a substrate and a method of thermally oxidizing the surface of a substrate. The latter method includes deposition of a metal having a low-melting point on a substrate by vacuum evaporation to form unevenness. For example, Japanese Patent Application Laid-Open 4-255908 discloses a method wherein a metal having a low melting point is vaporized on a surface of the substrate to form discontinuous projections at a coverage of 10 to 85%.

Although these texture treatments provide moderate unevenness on the surface of a magnetic recording medium, the surface profile has densely arrayed projections as shown in FIG. 3A. Therefore, if such a magnetic recording medium is worn down, the contact area increases as shown in FIG. 3B, resulting in reduction in CSS durability. In particular, in order to achieve a low glide height, the surface roughness should be made smaller as a whole as shown in FIG. 4A, in which case the contact area will increase rapidly on wearing as shown in FIG. 4B. As a result, the CSS durability is seriously reduced, and it would be very difficult to secure durability.

According to the method disclosed in the above-mentioned Japanese Patent Application, the magnetic head becomes unfavorably adsorptive to the surface of the medium since it is difficult to control the height of the projection, and the area of the apices becomes large. In addition, the magnetic layer may be adversely affected by the gas which may be generated from the substrate since the projections fail to cover the entire surface of the substrate.

SUMMARY OF THE INVENTION

Accordingly, an object of the invention is to provide a magnetic recording medium having a low glide height and yet exhibiting improved CSS durability.

To accomplish the above object, the inventors have conducted extensive study and found as a result that a magnetic recording medium can be prevented from rapidly increasing the contact area due to wear by providing a discrete profile of projections with their controlled height within a specific range.

The present invention has been completed based on the above finding. That is, the invention has accomplished the above object by providing a magnetic recording medium comprising a substrate and a magnetic layer provided on the substrate, wherein the magnetic recording medium has a surface profile satisfying the following conditions (1) to (6):

(1) the number of peaks which project above a slice line at a depth of 25 Å from the maximum peak height (PC25) is 5 to 100/mm;
(2) the ratio of the number of peaks which project above a slice line at a depth of 50 Å from the maximum peak height (PC50) to PC25 (PC50/PC25) is 1 to 3;
(3) the ratio of a high spot count (HSC) at the center line to PC25 (HSC/PC25) is 1 to 4;
(4) the skewness is 1 to 5;
(5) the maximum peak height is 60 to 200 Å; and
(6) the bearing ratio at a depth of 50 Å from the maximum peak height is not more than 3%.

The magnetic recording medium according to the invention can have a reduced glide height and improved CSS durability owing to the discrete projections formed on the surface thereof and the controlled height of the projections.

The magnetic recording medium of the present invention is useful as, for example, a magnetic drum, a magnetic tape, a magnetic card or a magnetic disk, and especially as a magnetic disk, such as a fixed disk.

DETAILED DESCRIPTION OF THE INVENTION

Figure 1A:
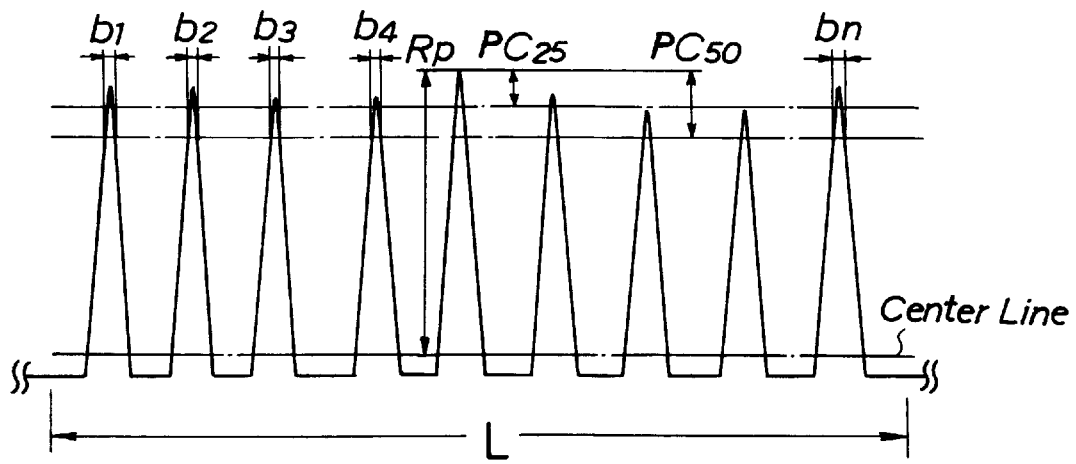
FIGS. 1A and 1B are schematic views showing the surface profile of a magnetic recording medium according to the present invention.
Figure 1B:
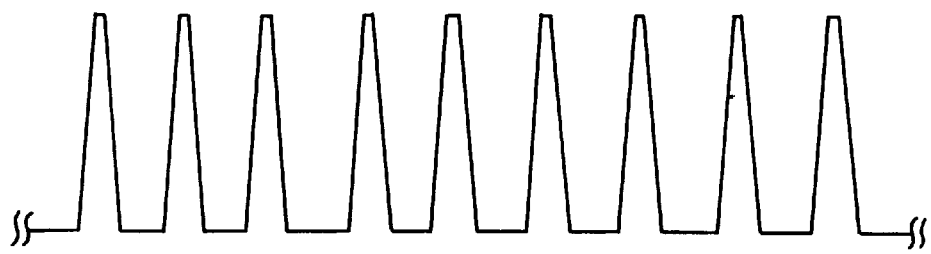

The magnetic recording medium of the present invention will be explained below by referring to the accompanying drawings. FIGS. 1A and 1B are schematic views showing the surface profile of a magnetic recording medium according to the present invention.

As mentioned above, the magnetic recording medium of the present invention is characterized by the surface profile thereof which satisfies the above-described conditions (1) to (6). In the magnetic recording medium whose surface profile satisfies the conditions (1) to (6), acute projections are formed discretely on the surface as shown in FIG. 1A. Therefore, even if the surface of the magnetic recording medium is being worn away as shown in FIG. 1B, the contact area does not increase abruptly, thereby bringing about improvement in CSS characteristics.

The conditions (1) to (6) are each described below in more detail.

The condition (1) is to provide that the number of peaks which project above a slice line at a depth of 25 Å from the maximum peak height (hereinafter referred to as Rp) is 5 to 100/mm. That number of peaks will hereinafter be referred to as PC25. The term "maximum peak height" as used herein means the distance from the center line to the top of the highest peak as measured in a measurement length L as shown in FIG. 1A. The term "center line" as used herein is a value calculated from the least squareness curve of the surface profile. The condition (1) is a measure of the degree of discreteness of the projections formed on the surface of the magnetic recording medium of the present invention. If PC25 is less than 5/mm, the surface fails to support a magnetic head and undergoes head crush. If it exceeds 100/mm, the coefficient of friction increases considerably while the surface is being worn. PC25 is preferably 10 to 50/mm.

The condition (2) is to provide that the ratio of the number of peaks which project above a slice line at a depth of 50 Å from Rp (hereinafter referred to PC50) to PC25, i.e., PC50/PC25 is 1 to 3, in which PC25 is as defined above. PC50 is a value obtained in the same manner as for PC25 but changing the depth of measurement from 25 Å to 50 Å as shown in FIG. 1A. To have PC50/PC25 of 1 to 3 means that the number of the peaks above the slice line at a depth of 50 Å from Rp is the same as that of the peaks above the slice line at a depth of 25 Å from Rp or not larger than 3 times the latter. In other words, while the magnetic recording medium of the present invention has a plurality of projections formed on its surface, such a plurality of projections have approximately the same level of height, that is, not having two distinct levels of projections, i.e., higher projections and lower projections. Therefore, the condition (2) is a measure of distribution of the heights of the projections formed on the surface of the magnetic recording medium of the present invention. If PC50/PC25 exceeds 3, a new contact area which appears when the wear reaches the depth of 25 Å is considerably large, leading to a considerable increase in coefficient of friction. PC50/PC25 is preferably 1 to 2.

The condition (3) is to provide that the ratio of a high spot count at the center line (hereinafter abbreviated as HSC) to PC25, i.e., HSC/PC25 is 1 to 4, in which PC25 is as defined above. The term "high spot count (HSC) at the center line" as used herein means the number of peaks projecting above the center line within a measurement length L. The condition (3) is another measure of distribution of the heights of the projections formed on the surface of the magnetic recording medium of the invention similarly to the condition (2). If HSC/PC25 exceeds 4, the contact area becomes very large when the wear reaches the depth corresponding to Rp, and the coefficient of friction becomes high, making a start of the drive difficult. HSC/PC25 is preferably 1 to 3.

The condition (4) is to provide that the skewness (hereinafter referred to as Rsk) is 1 to 5. The term "skewness" as used herein means a value (nondimensional number) indicative of the symmetry of the profile about the center line. Skewness can be calculated from equation (I):

$$Rsk = \frac{1}{n (Rq)^3} \sum_{i=1}^{i=n} (Y_i)^3 \quad (I)$$

wherein $Y_i$ represents the distance from the center line to the peak (positive value) or valley (negative value); Rq represents a root-mean-square (rms) roughness which is calculated by $$Rq = \sqrt{\frac{1}{L} \int_0^L y^2(x)dx}$$

wherein L is the measurement length and Y is the distance from the center line; and n represents the number of data points. With Rsk falling within the above specified range, the magnetic recording medium having a low glide height and high CSS durability can easily be obtained. Rsk is preferably 1 to 3.

The condition (5) is to provide that the maximum peak height (Rp) is 60 to 200 Å, wherein Rp is as defined above with regard to condition (1). The condition (5) is an index of the height of projections formed on the surface of the magnetic recording medium of the present invention. If Rp is less than 60 Å, a sufficient margin of wear cannot be secured, resulting in deterioration of durability or adsorption of the magnetic head to the surface of the medium. If it exceeds 200 Å, reduction of glide height cannot be expected. Rp is preferably 70 to 160 Å.

The condition (6) is to provide that the bearing ratio at a depth of 50 Å from the maximum peak height (Rp) (hereinafter referred to as Tp50) is not more than 3%. The term "bearing ratio at a depth of 50 Å from Rp" as used herein means the length of bearing surface, expressed as a percentage based on the measurement length L, at the line drawn at 50 Å below Rp in parallel with the center line. Taking the bearing lengths $b_1, b_2, b_3, \ldots, b_n$ as shown in FIG. 1A, Tp50 is calculated from equation (II):

$$Tp50 = \frac{b_1 + b_2 + b_3 + b_4 \ldots b_n}{L} \times 100 = \frac{100}{L} \sum_{i=1}^{i=n} bi \quad (II)$$

Bearing ratio Tp50 of the condition (6) is an index of the acuteness of the projections formed on the surface of the magnetic recording medium of the invention. The smaller the Tp50, the acuter the profile of projections. If Tp50 exceeds 3%, the initial coefficient of friction becomes large, and the margin for the increase of friction coefficient with the progress of wear becomes small. Tp50 is preferably not more than 2.0%.

The measurements of the surface roughness parameters in terms of the conditions (1) to (6) are made with a stylus-type profilometer (TENCOR P2) under the following conditions.

Probe diameter: 0.6 μm (radium of curvature)
Contact pressure: 7 mg
Measurement length: 250 μm×8 points
Tracing speed: 2.5 μm/sec
Cut-off: 1.25 μm (lowpass filter)

In the present invention, a magnetic recording medium having a low glide height and improved CSS durability can be obtained provided that all the conditions (1) to (6) are satisfied. If even only one of the conditions is unfulfilled, the effects of the invention are not manifested.

An embodiment of a magnetic recording medium which preferably satisfies the conditions (1) to (6) is described below.

Figure 2:
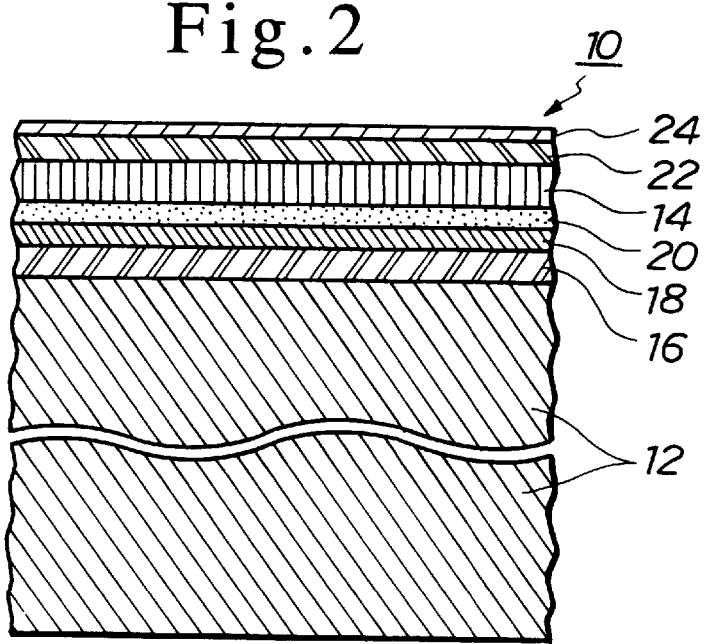
FIG. 2 is a schematic view showing the structure of a preferred magnetic recording medium of the invention.
Figure 3A:
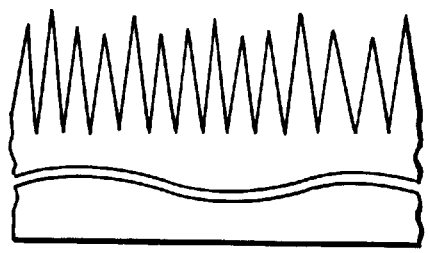
FIGS. 3A and 3B show the surface profile of a conventional magnetic recording medium.
Figure 3B:
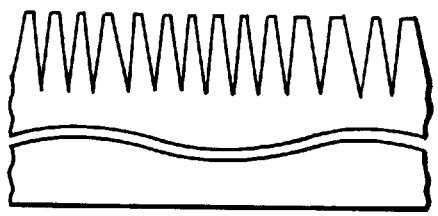
Figure 4A:
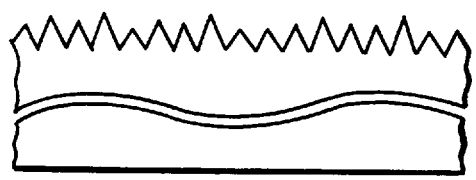
FIGS. 4A and 4B show the surface profile of a conventional magnetic recording medium.
Figure 4B:
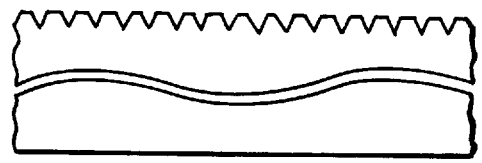

The magnetic recording medium according to the present invention comprises a substrate and a magnetic layer provided on the substrate. Methods for obtaining a magnetic recording medium satisfying the conditions (1) through (6) include a method of subjecting the substrate to a texture treatment to form unevenness, thereby to provide desired unevenness corresponding to the unevenness on the surface of the magnetic recording medium, and a method of forming a metal layer having an uneven surface by physical vapor deposition, with the latter method being preferred. A particularly preferred method for obtaining a magnetic recording medium satisfying the conditions (1) to (6) comprises successively providing a layer made of an Al—M—O alloy wherein M is a metal capable of forming a carbide (hereinafter referred to as a carbide-forming metal), a layer made of a metallic material which takes on a close packed hexagonal structure at 800° C. or lower, and a layer made of a metallic material which takes on a body-centered cubic structure in this order between the substrate and the magnetic layer thereby affording a discrete profile of projections. Such a preferred magnetic recording medium will hereinafter be illustrated by referring to the accompanying drawing. FIG. 2 is a schematic view showing the structure of the preferred magnetic recording medium of the invention.

The preferred magnetic recording medium 10 shown in FIG. 2 comprises a substrate 12 and a magnetic layer 14 provided on the substrate 12. Between the substrate 12 and the magnetic layer 14 are successively provided a layer 16 made of an Al—M—O alloy wherein M is a carbide-forming metal, a layer 18 made of a metallic material which takes on a close packed hexagonal structure at 800° C. or lower, and a layer 20 made of a metallic material which takes on a body-centered cubic structure in this order. On the magnetic layer 14 are further provided a protective layer 22 and a lubricant layer 24. The profile of projections are not shown in FIG. 2 for convenience sake.

A magnetic recording medium satisfying the conditions (1) to (6) can easily be obtained by successively providing the layers 16, 18 and 20 in this order between the substrate 12 and the magnetic layer 14 as shown in FIG. 2 and by using the resulting discrete profile of projections. The layers in the magnetic recording medium of FIG. 2 are each explained below.

The layer 16 is a layer made of an Al—M—O alloy wherein M is a carbide-forming metal. M preferably includes Si, Cr, Ta, Ti, Zr, Y, Mo, W, and V, with Si being most preferred. One or more of these metals may be used as M. Where a carbon substrate is used, a particularly improved adhesion between the substrate and the layer 16 is obtained as hereinafter described. The concentration of the metal M in the Al—M—O alloy is preferably 1 to 10 wt %, while varying depending on the kind of the metal used. On the other hand, the concentration of oxygen is preferably 1 to 10 wt %. The layer made of the Al—M—O alloy can be formed by physical vapor deposition (PVD), such as vacuum evaporation, ion plating and sputtering. The layer 16 is preferably formed by sputtering of an Al—M alloy in an (Ar+$O_2$) gas atmosphere. The sputtering is preferably carried out under an argon gas pressure of 2 to 30 mTorr and an oxygen gas pressure of 1 to 50% of the argon gas pressure. During sputtering, the substrate is preferably kept at such a temperature that the layer made of the Al—Si—O alloy may not exhibit closely (densely) formed uneven profile, specifically at room temperature to 150° C. The layer 16 preferably has a thickness of 5 to 100 nm.

The layer 18 is made of a metallic material which takes on a close packed hexagonal structure at 800° C. or lower. Such a metallic material preferably includes Ti, Zr, Sc, Y, Zn, Cd, and alloys thereof, with Ti and Ti alloys being most preferred. The layer 18 preferably has a thickness of 5 to 200 nm. The layer 18 can be formed by known thin film formation techniques, for example, PVD, such as sputtering, vacuum evaporation and ion plating.

The layer 20 is made of a metallic material taking on a body-centered cubic structure. Such a metallic material preferably includes Cr, Mo, W, V, Nb, Ta, and alloys thereof, with Cr and Cr-containing binary alloys being most preferred. Examples of the Cr-containing binary alloys are CrTi, CrMo, CrW, CrNb, CrSi, CrCo, and CrTa. The layer 20 preferably has a thickness of 5 to 150 nm. The layer 20 can be formed by PVD, etc. similarly to the layer 18.

On successively forming the layers 16, 18 and 20 in this order, the integrated layer which consists of the layers 16, 18 and 20, and has a discrete profile of projections appear on the substrate 12. Thereinafter, the magnetic layer and other layers as hereinafter described are deposited on the integrated layer (specifically, on the layer 20), thereby forming a discrete profile of projections corresponding to the discrete profile of projections of the integrated layer on the surface of the magnetic recording medium. If any one of the layers 16, 18 and 20 is missing, such a discrete profile of projections does not appear, failing to achieve the surface profile satisfying the conditions (1) to (6).

The discrete profile of projections which is formed on the substrate 12 by successively depositing the layers 16, 18 and 20 in this order preferably has an average diameter of a circle-equivalent in plan view (hereinafter the diameter will be referred to as b) of 30 nm$\leq$b$\leq$400 nm, more preferably 50$\leq$b$\leq$300 nm, most preferably 50 nm$\leq$b$\leq$200 nm. If the average diameter b is less than 30 nm, it becomes difficult to form the discontinuous convexed portions as hereinafter described in the magnetic layer. If the average diameter exceeds 400 nm, the spacing loss between the medium and the magnetic head becomes too large. Therefore, the above range is preferred.

The distance d between the adjacent projections is preferably 0<d$\leq$b. If the distance d exceeds the average diameter b, the effect of reduced noise is lowered.

The integrated layer which consists of the layers 16, 18 and 20, and has a discrete profile of projections is a continuous layer, and covers any layers (including the substrate) located below the integrated layer (specifically, below the layer 16) at a coverage of 90% or more, more preferably substantially 100%. When the coverage is 90% or higher, the gas which may be generated from the substrate (in particular glass substrate) is prevented from adversely affecting the magnetic layer. In this embodiment, the layers located below the layer 16 is the substrate 12.

The substrate 12 and magnetic layer 14 of the magnetic recording medium shown in FIG. 2 are described. The substrate 12 may be either a magnetic substrate or a nonmagnetic substrate, but, in general, a nonmagnetic substrate is used. Useful nonmagnetic substrates include an Al substrate, an NiP-plated Al alloy substrate, a tempered glass substrate, a crystallized glass substrate, a ceramic substrate, an Si alloy substrate, a Ti substrate, a Ti alloy substrate, a plastic substrate, a carbon substrate, and a composite substrate made up of these materials. In particular, a carbon substrate, especially a glassy carbon substrate is preferably used in the present invention; for it is advantageous for size and thickness reduction and has excellent heat resistance and conductivity.

The magnetic layer 14 includes a thin metallic film type magnetic layer formed by, for example, PVD. Preferred materials for forming the thin metallic film type magnetic layer include Co-based magnetic alloys, such as CoCr, CoNi, CoCrX (provided that X is not Cr), CoCrPtX (provided that X is not Cr nor Pt), CoSm, CoSmX (provided that X is not Sm), CoNiX (provided that X is not Ni), and CoWX (provided that X is not W), wherein X represents one or more metals selected from the group consisting of Ta, Pt, Au, Ti, V, Cr, Ni, W, La, Ce, Pr, Nd, Pm, Sm, Eu, Li, Si, B, Ca, As, Y, Zr, Nb, Mo, Ru, Rh, Ag, Sb, and Hf. These alloys may be used either individually or as a combination of two or more thereof. The magnetic layer preferably has a thickness of 20 to 50 nm.

Since the magnetic layer 14 is deposited on the discrete profile of projections formed by successively depositing the layers 16, 18 and 20 in this order, the magnetic layer 14 becomes a structure of an aggregate made up of the plurality of the convexed portions (not shown in FIG. 2) corresponding to the discrete profile of projections. In other words, there are substantially discontinuous areas between every adjacent convexed portion so that the individual convexed portions are physically isolated from each other. Because the magnetic layer 14 comprises an aggregate of such discontinuous convexed portions, adjacent convexed portions 18 only interfere with each other with a very weak magnetic force. As a result, the noise of the magnetic recording medium is reduced.

The distance between adjacent convexed portions at the magnetic layer 14 (hereinafter the distance will be referred to as x) preferably falls within a range of $0.2\ nm \leq x \leq 30\ nm$. If x is less than 0.2 nm, the magnetic force binding between adjacent convexed portions increases, tending to incur an increase in noise. If x exceeds 30 nm, the number of magnetic fluxes per unit area is reduced, tending to reduce the output. Therefore, the above range is preferred. The distance x preferably falls within a range of $0.2\ nm \leq x \leq 10\ nm$, more preferably $0.2\ nm \leq x \leq 5\ nm$.

The average crystal grain size a of the magnetic layer 14 preferably falls within a range of $2\ nm \leq a \leq 30\ nm$, preferably $2\ nm \leq a \leq 20\ nm$. If the average crystal grain size a is less than 2 nm, the magnetic crystal grains are apt to have unstable magnetism. An average crystal grain size a exceeding 30 nm is disadvantageous for high-density recording. Therefore, the above range is preferred. The term "average crystal grain size a" as used herein means an average grain size of the magnetic crystal grains in the individual convexed portions which form the magnetic layer 14. Accordingly, each convexed portion is an aggregate composed of a plurality of the magnetic crystal grains. In the magnetic recording medium 10 shown in FIG. 2, the magnetic crystal grains of the magnetic layer 14 have a column structure similar to those of a conventional magnetic layer formed by thin film deposition techniques such as PVD, and the average grain size of the magnetic crystal grains corresponds to the diameter of the transverse cross section of the column structure. The grain size can be controlled with the forming conditions (e.g. sputtering conditions) of the magnetic layer.

The average crystal grain size a of the magnetic layer 14 and the average diameter b of the abovementioned profile of projections preferably have the relationship of $b \geq 2a$. As previously stated, the average crystal grain size a and the average diameter b should preferably fall within their respective specific ranges and, at the same time, they are more preferably correlated with each other. Because of the above relationship between them, the present invention produces an advantageous effect that the noise occurring in high-density recording is reduced, as compared with magnetic recording media having no projections.

The advantageous effects of the present invention are particularly pronounced in high-density recording media of 80 kfci or higher. When the present invention is applied particularly to high-density recording media of 90 kfci or higher, especially 100 kfci or higher, the degree of noise reduction in high-density recording is high, as compared with magnetic recording media in which the magnetic layer comprises a continuous layer.

The protective layer 22 and lubricant layer 24 of the magnetic recording material shown in FIG. 2, which are successively provided on the magnetic layer 14, are not particularly limited and may be any of those employed in general magnetic recording media. For example, the protective layer 22 is made of a material having high hardness for wearability. Examples of suitable materials include an oxide, a nitride or carbide of a metal, e.g., Al, Si, Ti, Cr, Zr, Nb, Mo, Ta or W; and carbon, e.g., diamond-like carbon. The lubricant layer 24 can be formed by coating with a perfluoropolyether type lubricant, vapor phase polymerization of a fluorocarbon compound and oxygen, especially by photo assisted CVD.

While a preferred embodiment of the magnetic recording medium of the present invention has been described in detail, conventional techniques concerning magnetic recording media can appropriately be applied to other particulars that have not been specifically described in detail.

The present invention will now be illustrated in greater detail by way of Examples, but it should be understood that the invention is not construed as being limited thereto.

EXAMPLE 1

A magnetic disk shown in FIG. 2 was prepared according to the following procedure.

A substrate made of glassy carbon having a density of 1.5 g/cm$^3$ (diameter: 1.8 in; thickness: 25 mil) was abraded to have a center-line average roughness Ra of 0.8 nm. On the substrate was formed a 80 nm thick layer made of an Al—Si—O alloy by DC magnetron sputtering using an Al—Si (Si content: 10 wt %) target in an Ar+O$_2$ (O$_2$ concentration: 10%) mixed gas atmosphere (pressure: 10 mtorr) at a substrate temperature of 120° C. On the resulting Al—Si—O layer were successively formed a 30 nm thick Ti layer and a 60 nm thick Cr layer by DC magnetron sputtering in an Ar gas atmosphere (pressure: 10 mTorr) at a substrate temperature of 200° C. The Al—Si—O alloy layer, Ti layer and Cr layer cover the glassy carbon substrate at a coverage of substantially 100%.

Subsequently, a 35 nm thick CoCrTa magnetic layer and a 15 nm thick glassy carbon protective layer were formed thereon in this order by DC magnetron sputtering in an Ar gas atmosphere (pressure: 10 mTorr) at a substrate temperature of 200° C.

On the protective layer was formed a 1.5 nm thick lubricant layer by dip coating of Fomblin AM2001 produced by Augimont Co., to obtain a magnetic disk. The magnetic layer of the magnetic disk had a structure of a discontinuous aggregate composed of a plurality of convexed portions corresponding to the discrete profile of projections formed by successively depositing the Al—Si—O alloy layer, the Ti layer and the Cr layer in this order.

Surface roughness parameters, GHT, and CSS durability of the resulting magnetic disk were measured in accordance with the following methods. The results obtained are shown in Table 2 below.

Surface Roughness Parameters

Measurements were made with a stylus-type profilometer (TENCOR P2) under the following conditions.

Probe diameter: 0.6 μm (radium of curvature)

Contact pressure: 7 mg

Measurement length: 250 μm×8 points

Tracing speed: 2.5 μm/sec

Cut-off: 1.25 μm (lowpass filter)

Each of parameter values was calculated using the results of the measurements.

GHT Measurement

A glide height test was carried out using MG150T manufactured by PROQUIP Co. with a 50% slider head. The magnetic disk passed at a glide height of 1.0 microinch was judged "Pass", and that not passed was judged "NG".

CSS Durability Measurement

The magnetic disks were given cycles of 5 seconds' running—5 seconds' stop at 4500 rpm by using a thin film head produced by Yamaha Corporation ($Al_2O_3$·TiC-made slider head) under a head load of 3.5 g and at a glide height of 2.8 inch. The magnetic disk whose coefficient of static friction reached 0.6 after 50,000 cycles or more was judged "Success", and that whose coefficient of static friction reached 0.6 before 50,000 cycles was judged "Fail". In Table 2, "Adsorption" means failure of CSS driving.

EXAMPLE 2 AND COMPARATIVE EXAMPLES 1 TO 4

Magnetic disks were produced according to the particulars shown in Table 1 below. The resulting magnetic disks were evaluated in the same manner as in Example 1, and the results obtained are shown in Table 2. In Example 2, the Al—Si—O alloy layer, Ti layer and Cr layer also cover the glassy carbon substrate at a coverage of substantially 100%.

TABLE 1

| | Substrate 12 | Layer 16 | Layer 18 | Layer 20 |
|---|---|---|---|---|
| Examples | | | | |
| 1 | Glassy Carbon | Ai—Si—O (thickness: 80 nm) Target: Ai—Si (10 wt %) Ar+$O_2$ (10%) (10 mTorr) Substrate Temperature: 120° C. Formed by sputterring | Ti (thickness: 30 nm) Target: Ti Ar (10 mTorr) Substrate Temperature: 200° C. Formed by sputterring | Cr (thickness: 60 nm) Target: Cr Ar (10 mTorr) Substrate Temperature: 200° C. Formed by sputterring |
| 2 | Glassy Carbon | Ai—Si—O (thickness: 10 nm) The same as Example 1 except for the thickness | Ti (thinckness: 60 nm) The same as Example 1 except for the thickness | Cr (thinckness: 30 nm) The same as Example 1 except for the thickness |
| Comparative Examples | | | | |
| 1 | Glassy Carbon | Ai—Si—O (thickness: 80 nm) The same as Example 1 | Ti (thinckness: 30 nm) The same as Example 1 | No layer formed |
| 2 | Glassy Carbon | Ai—Si—O (thickness: 80 nm) The same as Example 1 | No layer formed | Cr (thickness: 60 nm) The same as Example 1 |
| 3 | Glassy Carbon | Al (thickness: 20 nm) Target: Al Ar (10 mTorr) Substrate Temperature: 260° C. Formed by sputterring | Ti (thinckness: 30 nm) The same as Example 1 | Cr (thickness: 60 nm) The same as Example 1 |
| 4 | Glassy Carbon | Al (thickness: 80 nm) The same as Comparative Example 3 except for the thickness | Ti (thinckness: 30 nm) The same as Example 1 | Cr (thickness: 60 nm) The same as Example 1 |

| | Substrate 12 | Magnetic Layer 14 | Protective Layer 22 | Lubricant Layer 24 |
|---|---|---|---|---|
| Examples | | | | |
| 1 | Glassy Carbon | CoCrTa (thickness: 35 nm) Target: CoCrTa Ar (10 mTorr) Substrate Temperature: 200° C. Formed by sputterring | C (thickness: 15 nm) Target: C Ar (10 mTorr) Substrate Temperature: 200° C. Formed by sputterring | Fomblin AM2001 (thickness: 1.5 nm) |
| 2 | Glassy Carbon | CoCrTa (thickness: 35 nm) The same as Example 1 | C (thickness: 15 nm) The same as Example 1 | Fomblin AM2001 (thickness: 1.5 nm) The same as Example 1 |
| Comparative Examples | | | | |
| 1 | Glassy Carbon | CoCrTa (thickness: 35 nm) The same as Example 1 | C (thickness: 15 nm) The same as Example 1 | Fomblin AM2001 (thickness: 1.5 nm) The same as Example 1 |
| 2 | Glassy Carbon | CoCrTa (thickness: 35 nm) The same as Example 1 | C (thickness: 15 nm) The same as Example 1 | Fomblin AM2001 (thickness: 1.5 nm) The same as Example 1 |
| 3 | Glassy Carbon | CoCrTa (thickness: 35 nm) The same as Example 1 | C (thickness: 15 nm) The same as Example 1 | Fomblin AM2001 (thickness: 1.5 nm) The same as Example 1 |
| 4 | Glassy Carbon | CoCrTa (thickness: 35 nm) The same as Example 1 | C (thickness: 15 nm) The same as Example 1 | Fomblin AM2001 (thickness: 1.5 nm) The same as Example 1 |

TABLE 2

|  | PC25 | PC50/PC25 | HSC/PC25 | Rsk | Rp | Tp50 (%) | GHT | CSS |
|---|---|---|---|---|---|---|---|---|
| Examples |  |  |  |  |  |  |  |  |
| 1 | 12 | 1.5 | 2.3 | 2.5 | 160.0 | 1.0 | Pass | Success |
| 2 | 35 | 2.1 | 3 | 1.4 | 100.0 | 2.0 | Pass | Success |
| Comparative Examples |  |  |  |  |  |  |  |  |
| 1 | 101 | 1.0 | 1.0 | 0.02 | 45.0 | 100.0 | Pass | Adsorption |
| 2 | 78 | 1.2 | 1.2 | 0.01 | 50.0 | 100.0 | Pass | Adsorption |
| 3 | 52 | 4.2 | 10.3 | 0.03 | 70.0 | 68.0 | Pass | Fail |
| 4 | 11 | 4.8 | 9.6 | 0.04 | 160.0 | 2.0 | NG | Success |

As is apparent from the results in Table 2, the magnetic recording media of Examples 1 and 2 whose surface profile satisfies all the conditions (1) to (6) are excellent in both glide height and CSS durability, whereas those of Comparative Examples 1 and 2 have substantially no projections, and those of Comparative Examples 3 and 4 have projections densely formed on the surface of the Al layer. Further, those in which not all the conditions (1) to (6) were satisfied (Comparative Examples 1 to 4) were inferior in CSS durability (Comparative Example 1 to 3) or failed to achieve a low glide height (Comparative Example 4).

The disclosure of Japanese Patent Application No. 7-228384, filed on Sep. 5, 1995 and Japanese Patent Application No. 8-7086, filed on Jan. 19, 1996, is hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic recording medium comprising a substrate and a magnetic layer provided on the substrate, wherein the magnetic recording medium has a surface profile satisfying the following conditions (1) to (6):

(1) the number of peaks which project above a slice line at a depth of 25 Å from the maximum peak height (PC25) is 5 to 100/mm;

(2) the ratio of the number of peaks which project above a slice line at a depth of 50 Å from the maximum peak height (PC50) to PC25 (PC50/PC25) is 1 to 3;

(3) the ratio of a high spot count (HSC) at the center line to PC25 (HSC/PC25) is 1 to 4;

(4) the skewness is 1 to 5;

(5) the maximum peak height is 60 to 200 Å; and (6) the bearing ratio at a depth of 50 Å from the maximum peak height is not more than 3%, and wherein the magnetic recording medium has a layer (1) made of an Al—M—O alloy, wherein M is a metal capable of forming a carbide, a layer (2) made of a metallic material which takes on a close packed hexagonal structure at 800° C. or lower, and a layer (3) made of a metallic material which takes on a body-centered cubic structure, successively provided in this order between the substrate and the magnetic layer, and wherein said layers (1), (2) and (3) cover any layers located below said layer (1) at a coverage of 90% or higher.

2. The magnetic recording medium according to claim 1, wherein M in the Al—M—O alloy is Si, Cr, Ta, Ti, Zr, Y, Mo, W or V and the oxygen concentration in the Al—M—O alloy is 1 to 10 wt %.

3. The magnetic recording medium according to claim 1, wherein the metallic material taking on a close packed hexagonal structure is Ti, Zr, Sc, Y, Zn or Cd, and the metallic material taking on a body-centered cubic structure is Cr, Mo, W, V, Nb or Ta.

4. The magnetic recording medium according to claim 1, wherein the substrate comprises carbon.

* * * * *